United States Patent
Maggio et al.

(10) Patent No.: US 6,821,593 B2
(45) Date of Patent: Nov. 23, 2004

(54) MOUNTING ASSEMBLY FOR ATTACHING ARTICLES TO SURFACES

(76) Inventors: Roberta Maggio, 2015 Greenwood Oaks, Houston, TX (US) 77062; Anthony Maggio, 2015 Greenwood Oaks, Houston, TX (US) 77062

( * ) Notice: Subject to any disclaimer, the term of this patent is extended or adjusted under 35 U.S.C. 154(b) by 0 days.

(21) Appl. No.: 10/337,067

(22) Filed: Jan. 6, 2003

(65) Prior Publication Data

US 2004/0131815 A1 Jul. 8, 2004

(51) Int. Cl.$^7$ .............................................. B32B 33/00
(52) U.S. Cl. ...................... 428/40.1; 40/600; 40/615; 40/624; 40/657; 428/41.7; 428/41.9; 428/42.1; 428/42.2; 428/192; 428/194; 428/900
(58) Field of Search ............................... 428/40.1, 41.7, 428/41.9, 42.1, 42.2, 192, 194, 900; 40/600, 615, 624, 657

(56) References Cited

U.S. PATENT DOCUMENTS

| | | | |
|---|---|---|---|
| 3,629,756 A | 12/1971 | Holtz | |
| 5,078,871 A | 1/1992 | McCready | |
| 5,261,174 A | 11/1993 | Blegen | |
| 5,303,489 A | 4/1994 | Blegen | |
| 5,342,665 A | * 8/1994 | Krawitz | ....................... 428/40 |
| 5,699,956 A | 12/1997 | Brennan | |
| 2002/0084880 A1 | 7/2002 | Barbaera-Guilem | |

* cited by examiner

Primary Examiner—Nasser Ahmad
(74) Attorney, Agent, or Firm—Royston, Rayzor, Vickery & Williams; William P. Glenn, Jr.

(57) ABSTRACT

A mounting assembly for attaching lightweight articles to surfaces incorporating an article fixation region opposite and distal to a poly-fastening region. A poly-fastening region includes at least one selective adhesive region adjacent to at least one magnetic region. In one embodiment, a selective adhesive region includes an adhesive layer covering a magnetic region comprising a magnet with sufficient magnetic strength to magnetically attach an article to a surface. In another embodiment, a selective adhesive region includes an adhesive surface of an adhesive layer adjacent to and co-planar with a magnetic surface of a magnetic region. In an alternative embodiment, a selective adhesive region is capable of variable planar alignment with respect to an adjacent magnetic surface. The selective adhesive region of a mounting assembly has sufficient strength to adhesively attach an article and mounting assembly to a surface.

17 Claims, 3 Drawing Sheets

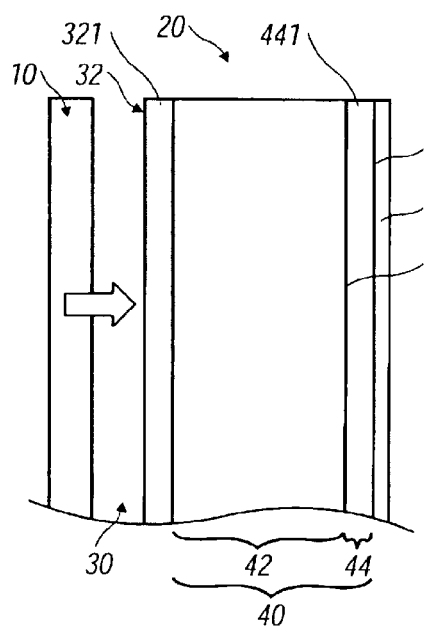
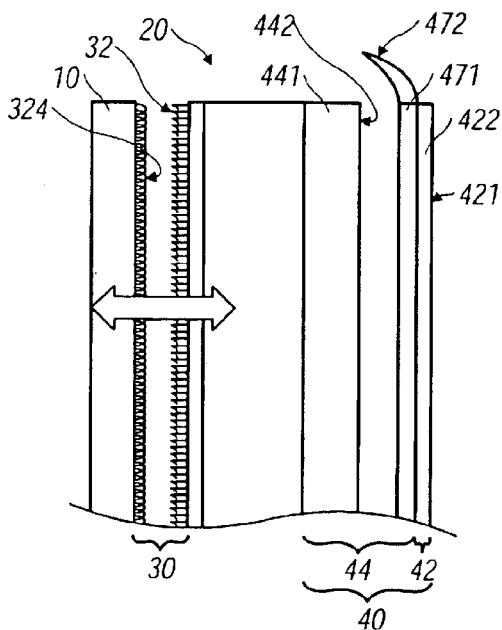
FIG. 5  FIG. 6
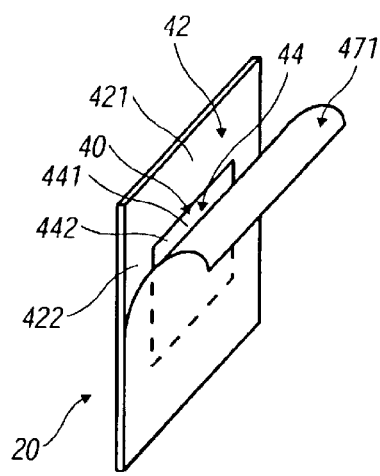
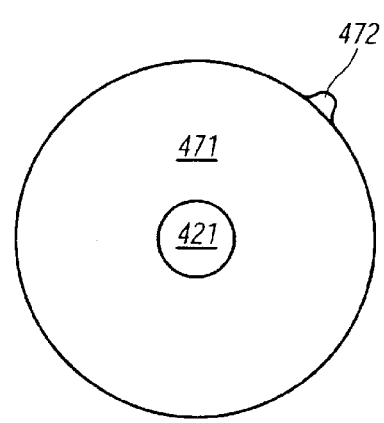
FIG. 7  FIG. 8

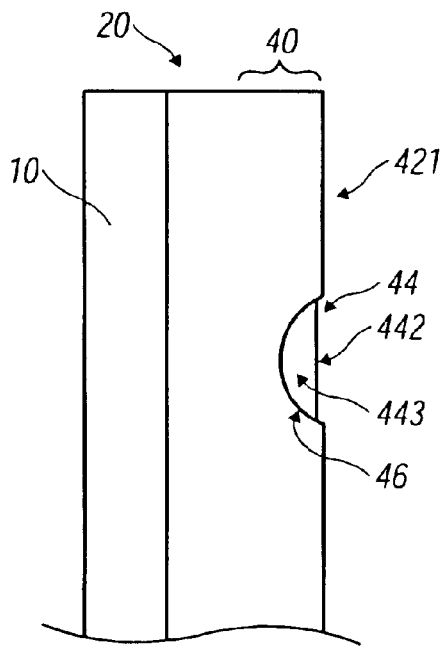
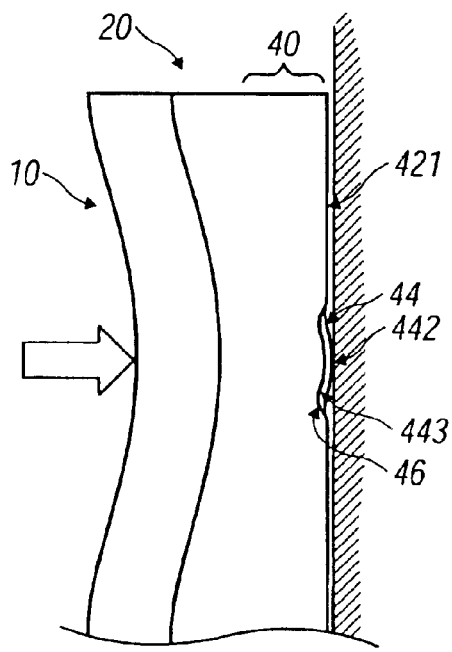
FIG. 9   FIG. 10
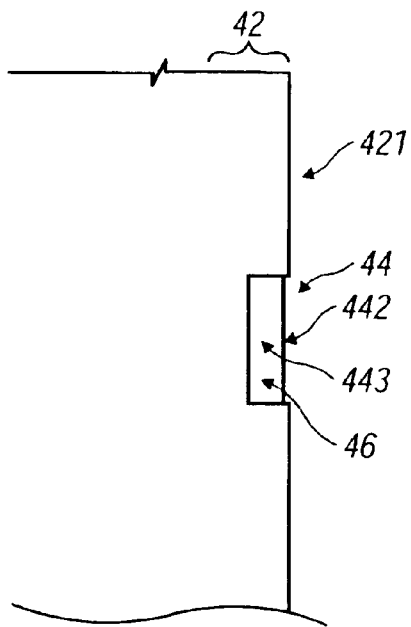
FIG. 11

MOUNTING ASSEMBLY FOR ATTACHING ARTICLES TO SURFACES

DESCRIPTION

1. Technical Field

The present invention relates generally to mounting assemblies for attaching lightweight articles to surfaces, specifically metallic and non-metallic surfaces. More specifically the present invention relates to a mounting assembly which enables a user to mount a lightweight article to a metallic surface (like a refrigerator, file cabinet or bumper of a vehicle) by means of a magnet or a non-metallic surface (like a wall, white board or a glass pane) by means of an adhesive. Such an adaptable mounting assembly allows a user to fix a lightweight article to any solid surface.

2. Background Art

In general, mounting assemblies for lightweight articles incorporate a fastening means like an adhesive layer to adhere to a variety of surfaces, metallic or otherwise. While such a configuration is not dependent upon a solid surface to which it adheres, the configuration is usually not adequate for removably fixing the article to a solid surface. Over time the adhesive character diminishes and finally fails after repeated mountings. Furthermore, if the adhesive is too cohesive, then the article is not easily removed without destroying or damaging the article or mounting assembly.

A typical alternative to adhesive mounting assemblies is a magnetic mounting structure. Such mounting structures include the use of a magnetic surface to adhere the article to a solid surface. However, such magnetic configurations are limited to solid surfaces to which a magnetic surface can attach.

Existing mounting assemblies that incorporate a magnetic surface and an adhesive surface that operate to mount an article to a magnet (sheet or otherwise) which in turn is mounted to a solid surface which encourages magnetic adhesion. Examples of such mounting assemblies are incorporated in U.S. Pat. No. 5,699,956 issued to to Brennan in 1997 (hereinafter Brennan '956); U.S. Pat. No. 5,303,489 issued to Blegen in 1994 (hereinafter Blegen '489); U.S. Pat. No. 5,261,174 issued to Blegen in 1993 (hereinafter Blegen '174); U.S. Pat. No. 5,078,871 issued to McCready in 1992 (hereinafter McCready '87); and U.S. Pat. No. 3,629,756 issued to Holtz in 1971 (hereinafter Holtz '756). However, each of these references do not provide an adhesive layer or region adjacent to a magnetic surface for purposes of non-magnetic mounting an article to a surface.

The Brennan '956 and McCready '871 references and the U.S. patent application Publication No. U.S. 2002/0084880 A1 attributed to Barbaera-Guilem et al (hereinafter Barbera-Guilem '880) disclose an adhesive layer on the magnetic surface that is placed adjacent to a solid surface. However, the Brennan '956 reference does not disclose or teach the use of an adhesive layer to mount the article (in Brennan's case a post card) to a solid non-metallic surface. The Brennan '956 reference relies solely upon the magnetic layer to mountthe article to a metallic surface. The adhesive layeron the magnetic surface functions to fix a paper back to a postcard thereby internalizing the magnetic surface and allowing the user to write on the back of a postcard. Similarly, the McCready '871 and Barbaera-Guilem '880 references do not disclose or teach the use of a magnetic surface to mount an article to a solid surface that encourages magnetic adhesion. The magnetic regions of the McCready '871 and Barbaera-Guilem '880 references assist in magnetic separation or filtration beyond the mounting surface. None of the references address the problems associated with the limitations of using one type of mounting system to fix a lightweight article to a surface.

In view of the above described deficiencies associated with mounting assemblies for lightweight articles, the present invention has been developed to alleviate these drawbacks and provide further benefits to the user. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventional mounting systems for lightweight articles and incorporates several additionally beneficial features.

It is one object of the present invention to provide a mounting system that allows a user to mount a lightweight article to a variety of solid surfaces irrespective of what the solid surface is comprised of.

It is another object of the present invention to provide a mounting system capable of removably mounting a lightweight article to a solid surface.

It is an additional object of the present invention to provide a mounting system capable of permanently fixing a lightweight article to a solid surface.

It is an additional object of the present invention to modify existing magnetic mounting systems with the application of an adhesive layer to expand the types of surfaces to which a lightweight article can be fixed.

The beneficial effects described above apply generally to each of the exemplary devices and mechanisms disclosed herein of the mounting system. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 5 is a cross sectional view of a mounting assembly for a lightweight article.

FIG. 6 is a cross sectional view of an alternative embodiment of a mounting assembly for a lightweight article.

FIG. 7 is a perspective view of a mounting assembly with co-planar magnetic and selective adhesive regions covered by a release liner.

FIG. 8 is a plan view of a mounting assembly with co-planar magnetic and selective adhesive regions with a release liner covering an adhesive region.

FIG. 9 is a cross sectional view of a mounting assembly with a movable adhesive surface.

FIG. 10 is a cross sectional view of a mounting assembly with a movable adhesive surface.

FIG. 11 is a cross sectional view of a mounting assembly with a movable adhesive surface.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other. Certain components may be described as being "adjacent" to one another. In these instances, it is expected that a relationship so characterized shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Figures 1, 2:
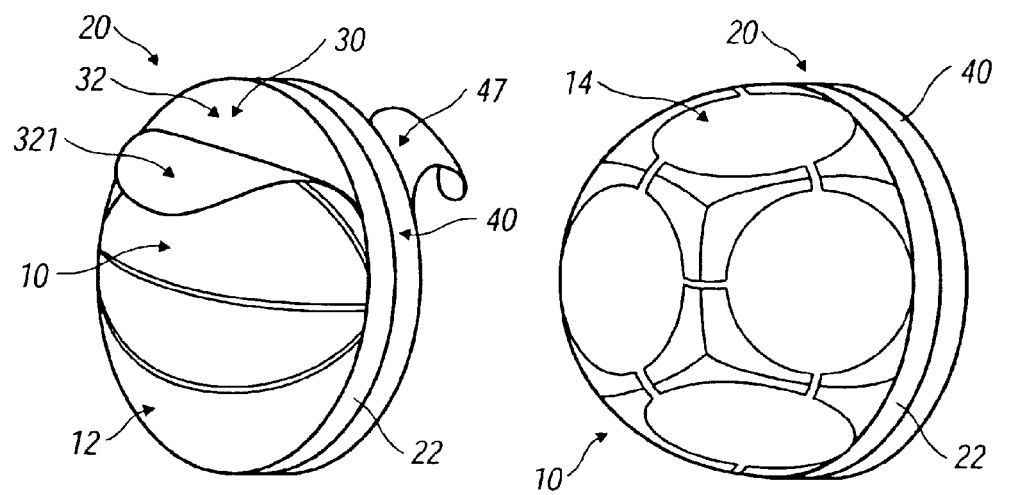
FIG. 1 is a perspective view of a mounting assembly with a lightweight two-dimensional article.
FIG. 2 is a perspective view of a mounting assembly with a lightweight three-dimensional article.
Figures 3, 4:
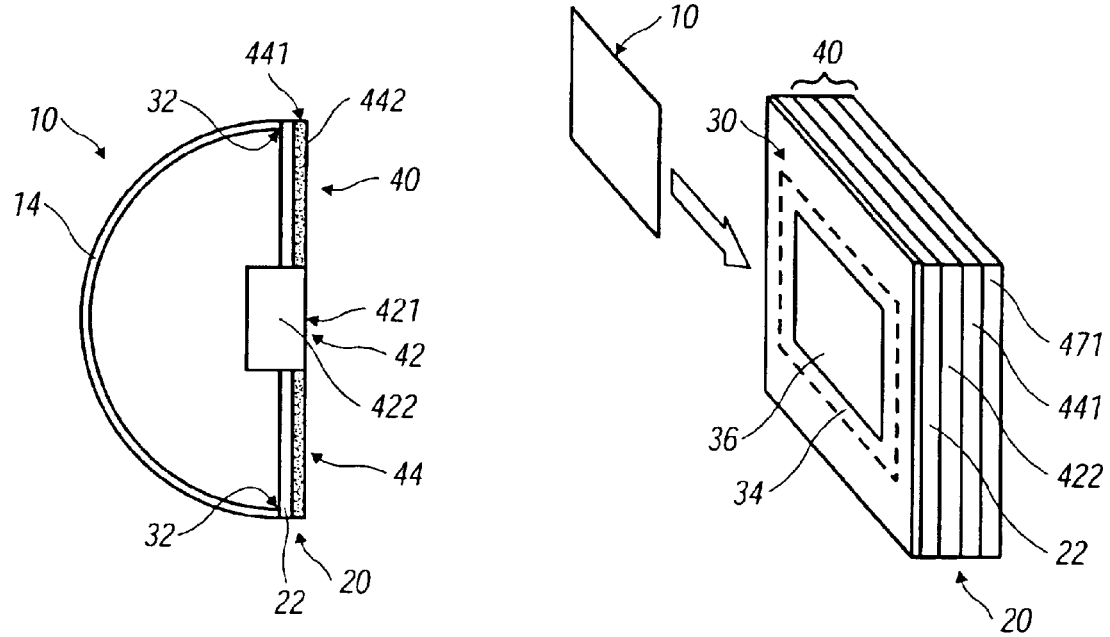
FIG. 3 is a cross sectional view of a mounting assembly with a lightweight three-dimensional article and a co-planar poly-fastening region.
FIG. 4 is a perspective view of a mounting assembly with a cavity for a lightweight article.

Referring generally to FIGS. 1, through 6, attachment of a lightweight article 10 to a solid surface by a mounting assembly 20 includes an article fixation region 30 and a poly-fastening region 40. As shown in FIG. 1, an article fixation region 30 is configured with at least one article fixation surface 32 to hold a lightweight article 10. As shown in FIGS. 3 and 4, a poly-fastening region 40 of a mounting assembly 20 is configured to include a magnetic region 42 and a selective adhesive region 44 to mount a lightweight article 10 against a solid surface.

Attachment of an article 10 to an article fixation region 30 can be accomplished through traditional fasteners including but not limited to an adhesive 321 (See FIGS. 1 and 20 5), snaps (not shown), buttons (not shown), magnets (not shown), and hook and loop arrangements 324 (See FIG. 6). It is contemplated that article fixation at an article fixation region 30 can be permanent or removable. Furthermore, it is contemplated that an adhesive 321 is placed on an article 10 and then fixed to an article fixation surface 32 (See FIG. 1).

In another embodiment, as shown in FIG. 4, a cavity 34 is formed in an article fixation region 30 to hold a lightweight article 10. It is further contemplated that a transparent surface 36 is adjacent to a cavity 34 to allow an article 10 to be viewed when placed inside (See FIG. 4).

As shown in FIGS. 1 through 3, a mounting system 20 can be adapted to hold a two-dimensional article 12 and/or a three-dimensional article 14. Examples of a two-dimensional article 12 include, but are not limited to, generally flat planar materials, like LCD displays, signs, labels, fabric, textured coverings, and/or protective coverings (See FIG. 1 and 4). Examples of a three-dimensional article 14 include but are not limited to miniatures or facsimiles of people, places or things, like a soccer ball (See FIG. 2). It is contemplated that a mounting assembly 20 and a lightweight article 10 would have a combined weight which would easily be picked up with one hand and mounted to a surface.

FIGS. 3 and 5 through 8 illustrate the various embodiments of a poly-fastening region 40. In FIGS. 3 and 7, a poly-fastening region 40 includes a magnetic region 42 co-planar with a selective adhesive region 44. In one embodiment, as shown in FIG. 3, magnetic region 42 includes a magnet 422 fixed to a mounting assembly 20, in which a magnetic surface 421 is co-planar with at least one adhesive surface 442 of an adhesive layer 441 positioned adjacent to a magnet 422. In another embodiment, as shown in FIG. 7, selective adhesive region 44 includes an adhesive layer 441 having an adhesive surface 442 co-planar with at least one magnetic surface 421 of a magnet 422 in sheet form positioned adjacent to a selective adhesive region 44.

It is contemplated that a magnetic region 42 of a mounting assembly 20 includes a magnet 422 in the form of a sheet, disc, block, or other three-dimensional shape. At least one magnetic surface 421 of a mounting assembly 20 is configured to magnetically attach an article 10 to a metallic surface. A magnetic surface 421 can have a uniform pole pattern of all north poles (or south poles) or a bi-polar pattern (random or pre-determined), so long as the magnetic surface 421 is capable of magnetically attaching an article 10 to a metallic surface. It is further contemplated that the magnetic field strength of a magnetic region 42 is capable of magnetically removably attaching an article 10 to a metallic surface.

As depicted in FIGS. 5 and 6, a selective adhesive region 44 of a mounting assembly 20 includes an adhesive layer 441 in the form of a pressure sensitive adhesive (permanent or non-permanent). Conventional pressure sensitive adhesives, particularly suited for a mounting assembly 20 are well known in the art, and are commercially available from adhesive manufacturers. For example, useful synthetic or natural rubber based adhesive compositions manufactured by the 3M Company or Avery Dennison Manufacturing Company. An adhesive layer 441 can be applied to a mounting assembly 20 as a coating, dispersion or spraying and the like. Alternatively, an adhesive layer 441 can be applied to a mounting assembly 20 as part of a double sided adhesive tape or sheet (not shown), in which one surface has a permanent pressure sensitive adhesive for mounting to assembly 20 and an opposite surface has an adhesive layer 441 for fixing a mounting assembly 20 to a surface.

FIG. 5 depicts a preferred embodiment of a mounting assembly 20, in which an article 10 is fixed by an adhesive 321 to an article fixation surface 32 which is distal to a poly-fastening region 42. The poly-fastening region 42 as shown in FIG. 5 includes a magnetic region 42 covered by a selective adhesive region 44 comprising an adhesive layer 441. An adhesive surface 442 of the adhesive layer 441 shown in FIG. 5, is covered by a release liner 47 in the form of a release sheet 471. It is contemplated that the mounting assembly 20 embodiment as shown in FIG. 5 will allow the user to mount an article 10 to a mounting assembly 20 at article fixation surface 32 and thereafter select an appropriate region(s) 42 and/or 44 of a poly-fastening region 40 to mount article 10 to a surface. As can be appreciated, the magnetic region 42 of the mounting assembly 20 depicted in FIG. 5, mounts an article 10 to a surface, if the surface is metallic or capable of magnetic adhesion. Likewise, the selective adhesive region 44 of the mounting assembly 20 depicted in FIG. 5, can be selected by the user by removing a release liner 47 and engaging an adhesive surface 442 to a surface. As can be appreciated, the user may engage the selective adhesive region 44 to assist a magnetic region 42 in magnetically mounting an article 10 to a metallic surface. As can be appreciated, where an adhesive layer 441 overlays a magnetic region 42 of a mounting assembly 20, the thickness of an adhesive layer 441 must not be so thick or consist of material that would impair the ability of a magnetic region 42 to magnetically attach an article 10 to a metallic surface. As can be appreciated, fixation of an article 10 to an article fixation region 30 can be permanent or removable as described further in this specification.

FIG. 6 illustrates yet another embodiment of a mounting assembly 20 in which an article 10 is removably fixed to an article fixation region 30 by hooks and loops 324. Furthermore, a poly-fastening region 40, and more specifically a selective adhesive region 44 of the mounting assembly 20 depicted in FIG. 6 includes a release liner sheet 471 between an adhesive layer 441 and a magnetic region 42, such that magnetic region 42 is removable from mounting assembly 20. It is contemplated that the user of mounting assembly 20 depicted in FIG. 6 will removably fix an article 10 to mounting assembly 20 which in turn can be magnetically mounted by magnetic region 42 to a metallic surface or other surface which encourages magnetic adhesion. Furthermore, the user may select to adhesively fix an article 10 by removing release liner sheet 471 and exposing an adhesive surface 442 to make adhesive contact with a surface. Finally, the user can prevent premature exposure of selective adhesive region 44 during dismounting of magnetic region 42 by using tab 472 connected to release liner sheet 471. As can be appreciated, fixation of an article 10 to an article fixation region 30 can be permanent or removable as described further in this specification.

FIG. 8 shows another embodiment of a mounting assembly 20, in which an adhesive surface 442 (not shown) is protected by a release liner 472. A tab 472 extends from release liner 472 to assist in its removal and thereby exposing adhesive surface 442. Where a release liner 47 overlays a magnetic region 42 of a mounting assembly 20, the thickness of a release liner 47 must not be so thick or consist of material that would impair the ability of a magnetic region 42 to magnetically attach an article 10 to a metallic surface. The same is true where a release liner 47 overlays an adhesive region 44 which overlays a magnetic region 42. It is contemplated that release liner 47 is in the form of a sheet 471 (See FIGS. 1 through 8). In an alternative embodiment (not shown), release liner 47 is a separate article 10. In yet a further alternative embodiment (not shown) a separate two-dimensional article 12 acts as a release liner 47 for a mounting assembly 20 to allow an arrangement not unlike what is found with Post-it® notes. Finally, in yet another embodiment of a release liner 47 for a mounting assembly 20, at least one planar surface of release liner 471 can be configured to display text, messages, logos, instructions and a combination thereof.

In yet another embodiment of a mounting assembly 20, as illustrated in FIGS. 9 through 11, a poly-fastening region 40 includes an adhesive surface 442 capable of variable planar alignments with respect to an adjacent magnetic surface 421. In such a configuration, when an adhesive surface 442 is urged to align co-planarly with a magnetic surface 421 (or extend slightly beyond a plane define by a magnetic surface 421), it adhesively attaches an article 10 and a mounting assembly 20 to a surface. Such selective adhesive attachment can be exclusive or in conjunction with magnetic adhesion from a magnetic surface 421.

As shown in FIG. 9, one embodiment of a mounting assembly 20 with a recessed selective adhesive region 44 positions an adhesive 443 in at least one adhesive receiver 46 formed in a poly-fastening region 40 configured to receive a quantity of adhesive 443 to form an adhesive surface 442 slightly out of plane with an adjacent magnetic surface 421 until selected to adhesively attach to a surface. Selective adhesion occurs by altering planar alignment of an adhesive surface 442 (or a portion thereof) with respect to a magnetic surface 421. Selective adhesion will normally occur when an adhesive surface 442 is coplanar with a magnetic surface 421. However, it is contemplated that selective adhesion may occur when an adhesive surface 442 approaches or passes through the plane defined by a magnetic surface 421.

As depicted in FIG. 10, an adhesive surface 442 is urged towards an adjacent magnetic surface 421 by deforming an adhesive receiver 46 formed in a flexible poly-fastening region 40. While only one form of an adhesive receiver 46 is depicted in FIG. 9, it is contemplated that an adhesive receiver 46 can be in the form of a channel, groove, sphere, polyhedron or a portion thereof as well as any other form suitable for holding an adhesive 423 and urging an adhesive surface 442 to change its planar position. It is further contemplated, though not shown, that an adhesive receiver 46 extends through a poly-fastening region 40 to an article fixation region 30. In such a configuration, adhesive 443 would be capable of removably holding both an article 10 to an article fixation region 30 and functioning as a component of a poly-fixation region 40, and in particular as a component of a selective adhesive region 44.

In another embodiment as depicted in FIG. 11, at least one adhesive receiver 46 is formed in or extends through a portion of a magnetic region 42 such that an adhesive surface 442 is slightly out of plane with a magnetic surface 421 until selected to adhesively attach to a surface by urging co-planar alignment with a magnetic surface 421. Urging an adhesive surface 442 to align co-planarly with a magnetic surface 421 can be accomplished by applying sufficient pressure to deform an adhesive receiver 46. It is further contemplated that movement of an adhesive surface 442 may occur by placing an adhesive on a moveable plate (no shown) configured to slide within an adhesive receiver 46. This embodiment is particularly well adapted for a mounting assembly with a rigid poly-fastening region 40.

The method of manufacturing a mounting assembly 20 includes the steps of forming a mounting structure 22 with an article fixation region 30 and a poly-fastening region 40 distal and opposite to one another, wherein the article fixation region 30 is configured to receive an article 10 at an article fixation surface 32. A poly-fastening region 40 is formed by positioning a selective adhesive region 44 adjacent to a magnetic region 42 and covering a selective adhesive region 44 with a release liner 47. It is contemplated that a mounting structure 22 is a magnet 422. One alternative method of manufacturing includes the step of positioning an adhesive layer 441 to cover a substantial portion of a magnetic region 42. Another method of manufacturing includes the step of positioning an adhesive layer 441 adjacent to a magnetic region 42 such that an adhesive surface 442 and a magnetic surface 421 are coplanar.

With respect to the above description, it is to be realized that the optimum dimensional relationships for the parts of the invention, to include variations in size, materials, shape, form, function and manner of operations, assembly and use, are deemed readily apparent and obvious to one skilled in the art, and all equivalent relationships to those illustrated in the drawings, and described in the specification, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents are considered to fall within the scope of the invention.

What is claimed is:

1. A mounting assembly for attaching a lightweight article to a surface comprising:
   a mounting structure comprising an article fixation region opposite and distal to a poly-fastening region;
   said article fixation region configured to hold the lightweight article;
   said poly-fastening region comprising at least one selective adhesive region adjacent to at least one magnetic region wherein said selective adhesive region comprises an adhesive layer which overlays a substantial portion of said magnetic region, wherein said adhesive layer is configured not to significantly impede said magnetic strength
   said magnetic region having sufficient magnetic field strength to magnetically attach the mounting assembly to the surface; and
   said selective adhesive region having sufficient strength to adhesively attach the mounting assembly to the surface.

2. The mounting assembly as claimed in claim 1, wherein said poly-fastening region further comprises a release liner overlaying at least a substantial portion of an adhesive surface of said selective adhesive region to inhibit adhesive attachment until a user selectively removes said release liner.

3. The mounting assembly as claimed in claim 1, wherein said selective adhesive region comprises an adhesive surface which is cop-lanar with and contiguous to at least one magnetic surface of said magnetic region.

4. The mounting assembly as claimed in claim 2, wherein said removable release liner is disposed between said selective adhesive region and said magnetic region.

5. The mounting assembly as claimed in claim 1, wherein said selective adhesive region comprises at least one recessed adhesive surface capable of variable planar alignment with respect to an adjacent magnetic surface of said magnetic region, wherein said adhesive surface adhesively attaches the mounting assembly to the surface when urged to align co-planarly with said magnetic surface.

6. A mounting assembly comprising:
   a lightweight article attached to a mounting structure by an article fixation region; said mounting structure having a poly-fastening region comprising at least one removable release liner at least one magnetic surface and at least one adhesive surface comprising an adhesive layer which overlays a substantial portion of said magnetic surface, and wherein said adhesive layer is configured not to significantly impede said magnetic field strength;
   said removable release liner covering at least a portion of said adhesive surface and configured to inhibit adhesive attachment until a user removes said release liner;
   and said poly-fastening region configured to attach to a metallic surface by said magnetic region and attached to a surface by said adhesive surface.

7. The mounting assembly as claimed in claim 6, wherein said adhesive surface is proximal to said mounting assembly, said magnetic surface is distal to said mounting assembly, and said removable release liner is disposed between said adhesive surface and said magnetic surface.

8. The mounting assembly as claimed in claim 6, wherein said magnetic surface is proximal to said mounting assembly and said release liner is distal to said mounting assembly.

9. A mounting assembly for displaying a lightweight article, wherein the mounting assembly comprises:
   a poly-fastening region opposite and distal to an article fixation region;
   a cavity formed in said article fixation region to hold the article; and
   said poly-fastening region comprising a magnetic surface and an adhesive surface, wherein said magnetic surface has sufficient magnetic field strength to magnetically attach the article adjacent to a metallic surface and said adhesive surface has sufficient cohesive strength to attach the article adjacent to a surface.

10. The mounting assembly as claimed in claim 9, wherein said article fixation region further comprises a transparent surface to view the article when place in said cavity.

11. The mounting assembly as claimed in claim 1, wherein at least one adhesive receiver is formed in a portion of said magnetic region and said selective adhesive region is located within said adhesive receiver.

12. The mounting assembly as claimed in claim 11, wherein a plate is slidably disposed within said adhesive receiver and said selective adhesive region is fixed to said plate.

13. The mounting assembly as claimed in claim 11, wherein said adhesive receiver extends through said magnetic region and said article fixation region and at least one adhesive surface of said selective adhesive region distal to said poly-fastening region is configured to releasably hold the lightweight article.

14. The mounting assembly as claimed in claim 1, wherein a releasable fastener mounts the lightweight article to said article fixation region.

15. The mounting assembly as claimed in claim 1, wherein a permanent fastener mounts the lightweight article to said article fixation region.

16. The mounting assembly as claimed in claim 1, wherein said article is a two-dimensional object selected from the group consisting of a sign, label, logo, picture, illustration, image, fabric, textured covering, protective coating and a combination thereof.

17. The mounting assembly as claimed in claim 1, wherein said article is a three dimensional object that projects away from said mounting structure.

* * * * *